(12) United States Patent
Blossom et al.

(10) Patent No.: US 7,489,698 B2
(45) Date of Patent: Feb. 10, 2009

(54) MEDIATOR BASED ARCHITECTURE FOR FIRST RESPONDER INTEROPERABILITY SYSTEMS (FRIS)

(75) Inventors: Kent L. Blossom, Wilmington, NC (US); Louis C. Foss, Frederick, MD (US); Paul E. Leuba, Hunt Valley, MD (US); Nuno D. Pereira, Derwood, MD (US); Tapas K. Som, Germantown, MD (US)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 11/014,313

(22) Filed: Dec. 16, 2004

(65) Prior Publication Data

US 2006/0147008 A1    Jul. 6, 2006

(51) Int. Cl.
*H04L 12/28* (2006.01)
*H04L 12/56* (2006.01)

(52) U.S. Cl. .................................................. 370/401
(58) Field of Classification Search ............... 370/239, 370/282, 465, 401–404, 352, 395, 474, 313, 370/466, 328, 338, 353; 379/220, 202, 219, 379/900, 37, 88.17, 201, 898; 709/249, 238, 709/203, 237, 230, 227, 232, 219, 231, 201, 709/229, 250, 246; 455/456, 411, 414, 420, 455/422, 432, 439
See application file for complete search history.

(56) References Cited

U.S. PATENT DOCUMENTS

| | | | |
|---|---|---|---|
| 6,202,096 B1 * | 3/2001 | Williams et al. | 709/230 |
| 6,345,239 B1 * | 2/2002 | Bowman-Amuah | 703/6 |
| 6,622,016 B1 * | 9/2003 | Sladek et al. | 455/414.1 |
| 6,721,286 B1 * | 4/2004 | Williams et al. | 370/282 |
| 6,735,621 B1 * | 5/2004 | Yoakum et al. | 709/218 |
| 7,145,898 B1 * | 12/2006 | Elliott | 370/352 |
| 2003/0041095 A1 * | 2/2003 | Konda et al. | 709/201 |
| 2003/0046580 A1 * | 3/2003 | Taniguchi et al. | 713/200 |
| 2005/0286466 A1 * | 12/2005 | Tagg et al. | 370/329 |
| 2006/0104306 A1 * | 5/2006 | Adamczyk et al. | 370/466 |
| 2006/0178918 A1 * | 8/2006 | Mikurak | 705/7 |

* cited by examiner

*Primary Examiner*—Wing F Chan
*Assistant Examiner*—Prenell P Jones
(74) *Attorney, Agent, or Firm*—Gibb & Rahman, LLC; John R. Pivnichny, Esq.

(57) ABSTRACT

A communication server has a message transfer unit that transfers messages between users operating under different, potentially non-compatible communication systems. A translator is connected to the message transfer unit. The translator translates messages sent to the message transfer unit into formats compatible with the different communication systems. A registration unit is used to associate communication systems with an incident. Communications between the different communication systems is restricted by incident and by registration. A voice/data mediator is used to conduct communication sessions through the message transfer unit. The communication sessions are conducted by the voice/data mediator between participants that are designated by a user. The participants are selected from users within communication systems that are registered with an incident.

28 Claims, 4 Drawing Sheets

MEDIATOR BASED ARCHITECTURE FOR FIRST RESPONDER INTEROPERABILITY SYSTEMS (FRIS)

BACKGROUND OF THE INVENTION

1. Field of the Invention

The invention generally relates to communication systems and more particularly to a communication server that has a communication mediator unit that sets up communication sessions between users operating under different, potentially non-compatible communication systems.

2. Description of the Related Art

Government agencies at all levels are grappling with how to coordinate and respond to public safety incidents. Traditionally, these agencies independently acquire communications technology designed primarily for intra-agency communications. Consequently, when units from different first responder organizations respond to the same incident, they are often unable to communicate directly with one another.

These first responder organizations need to enable interoperability in both mobile data communications and voice communications systems. Ideally, the same technical and operational platform would support data and voice interoperability, leveraging modem, web enabled systems to provide interoperable mobile data and voice communications.

The below-referenced U.S. patents disclose embodiments that were satisfactory for the purposes for which they were intended. The disclosures of the below-referenced prior U.S. patents, in their entireties, are hereby expressly incorporated by reference into the present invention for purposes including, but not limited to, indicating the background of the present invention and illustrating the state of the art. For example, U.S. Pat. Ser. No. 10/605,925 discloses an integrated server side architecture for voice and data.

SUMMARY OF THE INVENTION

The invention presents a communication server that has at least one Session Gateway unit that transfers IP (or other digital communication protocol) based messages (either representing data/text messages or representing digitized voice) between users operating under different, potentially non-compatible communication systems. With the invention, a wireless connection manager is connected to the session gateway unit to allow transmission of the data/text or voice messages across different non-compatible mobile wireless protocols used by the different communication systems. A registration unit is used to associate a particular communication session with an incident. Thus, with the invention, each communication session between the different communication systems is associated with a specific incident and specific participants registered with that incident. In addition, communication sessions can be established between communication systems that are not associated with an incident by utilizing a global directory which provides a mechanism to find and locate different user's communication systems. A communication mediator is used to initiate communication sessions through the session gateway unit. The communication sessions are conducted by the voice/data communication mediator between participants that are designated by a user of the system. The participants are selected from users within communication systems that are registered with an incident. The participants can each maintain multiple communication devices (e.g., cell phone, two-way radio, text messaging, etc.), and the communication mediator is adapted to automatically attempt to communicate with different addressable communication devices maintained by the participants in a predetermined order. This predetermined order can be different for different participants and is established according to the individual preferences of each of the participants or by other means as determined by the communications mediator.

One feature of the invention is that the communication mediator is adapted to automatically select an appropriate communication mode (e.g., text, audio, cell phone, two-way land mobile radio, text messaging, etc.) depending upon the preferred communications modes of the participants designated by the user. If necessary, the invention uses a voice/text converter to convert voice messages into text messages and text messages into voice messages, such that a voice user in a first wireless communication system may transparently communicate with a data user in a second wireless communication system through an instant messaging server. Also, the communication mediator can automatically select whether the communication session will be a one-to-one communication session, a one-to-many communication session, or a many-to-many communication session. The session gateway unit is adapted to transfer the messages so as to provide real-time communication between users of the different wireless communication systems.

The invention also presents a method of providing communications between different communication systems that begins by identifying an incident, determining the persons associated with that incident, and associating the appropriate communication system with each participant. The invention initiates a session between the communication systems by using the session gateway and manages the difference between different wireless communication systems through a wireless connection manager.

Also, the invention allows a user to designate, which participants will participate in a communication session. More specifically, the participants are selected from users within communication systems that are already registered with an incident and/or are available in the global directory. The participants can maintain multiple communication devices (e.g., cell phone, PDA, two-way land mobile radio) and the invention automatically attempts to communicate with different communication devices maintained by the participants in a predetermined order using the communication mediator.

Thus, the invention coordinates accessing data (incident, participants associated with an incident, participants' communication systems and the preferred order in which they should be contacted) and then creating communication sessions across different communication systems to which the participants belong. Additionally, the system can create sessions between participants in voice only communication systems and participants in text/data only communication systems.

The invention automatically selects an appropriate communication mode (e.g., land-line telephone, wireless telephone, cellular telephone, text messaging, two-way land mobile radio, broadcast radio, e-mail, and voice over internet protocol (VOIP), etc. ) depending upon the preferred communication modes of the participants designated by the user. The invention also automatically selects whether the communication session will be a one-to-one communication session, a one-to-many communication session, or a many-to-many communication session.

The translating process (voice/text converter) translates voice messages to text messages and translates data messages to text messages, such that a voice user in the firs communication system may transparently communicate with a text/data user in the same or the second communication system through the communication server. The transmitting process transfers the messages so as to provide real-time communication between users of the different communication systems.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

Figure 1:
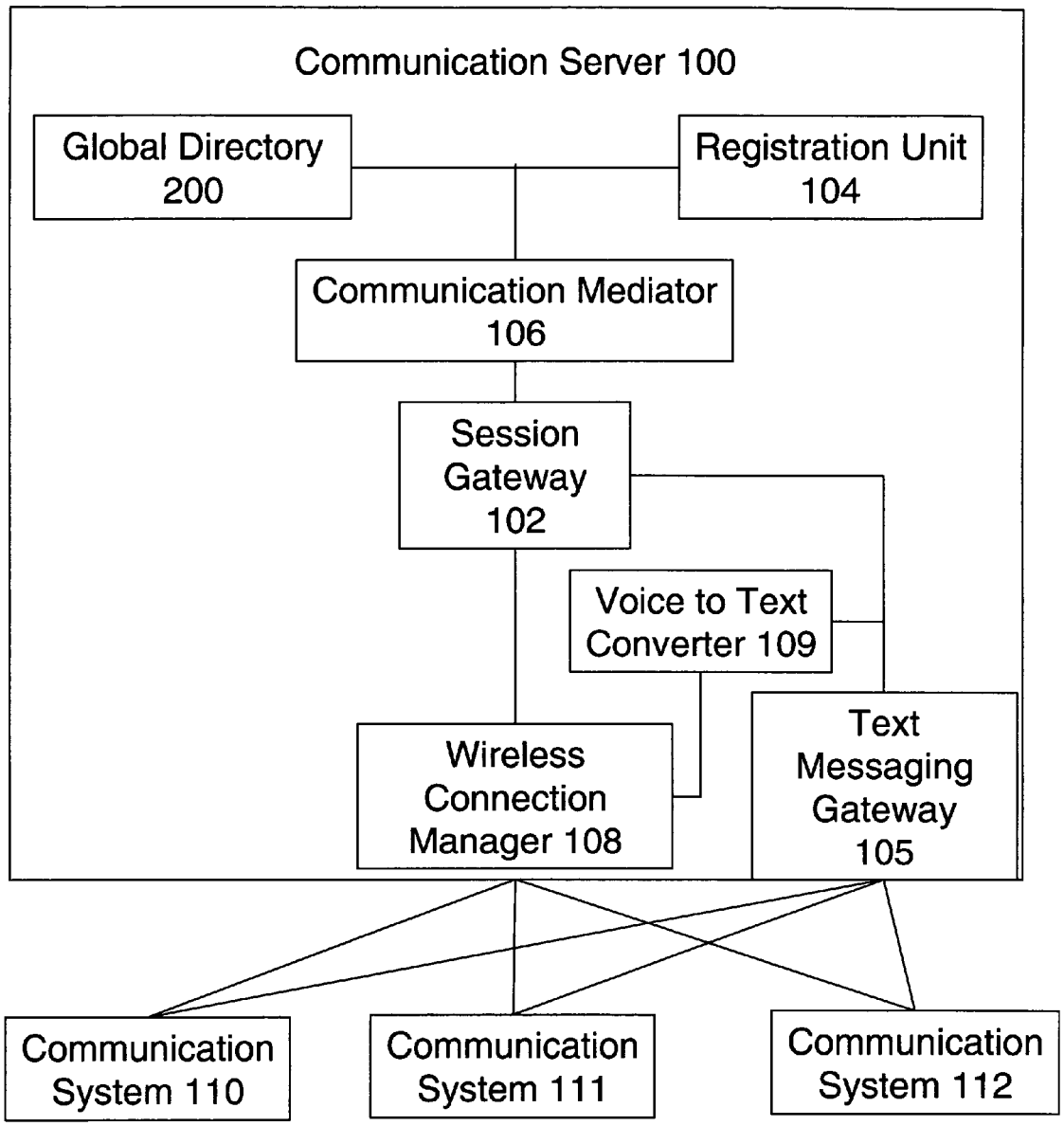
FIG. 1 is a schematic diagram of a system according to the invention.

The present invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

As shown in FIG. 1, the invention provides a communication server 100 that has a session gateway unit 102 that initiates communication sessions between users operating under different, potentially non-compatible communication systems 110-112. With the invention, a Wireless connection manager 108 is connected to the session gateway unit 102. The wireless connection manager manages the differences between different communication systems 110-114. A registration unit 104 is used to associate communication systems 110-114 with an incident.

Thus, with the invention, communications between the different communication systems 110-114 is restricted by incident and by registration. A communication mediator 106 is used to initiate communication sessions through the wireless connection manager unit 108 and (if required) through a text messaging gateway 105. The communication sessions are initiated by the communication mediator 106 between participants that are designated by a user. The participants are selected from users within communication systems 110-114 that are registered with an incident.

One feature of the invention is that the communication mediator 106 is adapted to automatically select an appropriate communication mode (e.g., text, audio, cell phone, two-way land mobile radio, text messaging, etc.) depending upon the preferred communications modes of the participants designated by the user.

Thus, the invention delegates call control functions to the communication mediator 106 between data interoperability and call interoperability functions. For example, the communication mediator 106 can access the registration unit 104 and search the list of users within communication systems that have registered with any given emergency "incident" of interest based on user agency, skills, or other parameters. A user can then designate one or more other users from the search result as participants in a communication session. The communication mediator 106 retrieves the required information that is maintained in the global directory 200 (see discussion of the global directory 200 below) about each user (e.g., a list of communication devices for each person, a sequence, or a rule determining the sequence in which these devices will be tried, address of devices associated with each user, etc.), type of communication (one to one, conference, broadcast), call the other user(s), and pass on the retrieved information that can be gainfully used by the voice interoperability infrastructure.

This idea can be implemented by using, for example, an application server with a Session Initiation Protocol (SIP) stack to connect one or more users together. This enables a very thin client, such as a web browser, to request an application server to create a call from a simple html page. Depending on the configuration of the application server, and the gateways available, any device that is addressable may be connected regardless of underlying technology. Any number of parties can be connected to any number of conferences associated with a particular incident or incidents by using a standard server.

Figure 2:
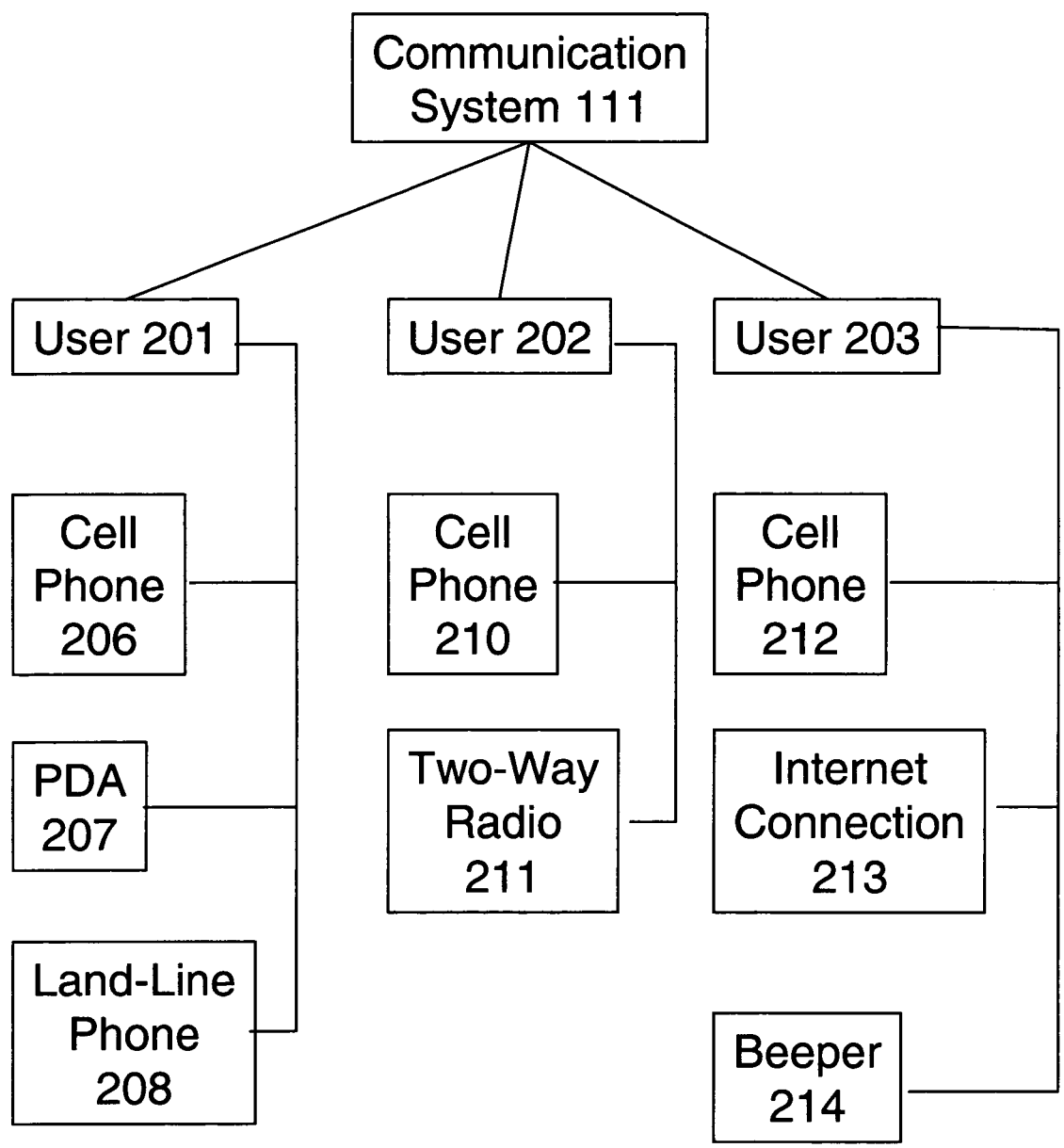
FIG. 2 is a schematic diagram of a system according to the invention.

For example, as shown in FIG. 2, using communication system 111 as an example, different users 201-203 can be part of the communication system, such as an entire fire/police department or a single fire/police station or sub-station. Therefore, each user 201-203 might be an individual fireman/police officer. User 201 may use a cell phone 206, personal digital assistant (PDA) 207, and a land-line phone 208 to communicate within communication system 111. Similarly, user 202 may use a cell phone 210 and two-way land mobile radio 211. Also, user 203 may use a cell phone 212, Internet connection 213, and a beeper 214. Other users may use one or more similar or different devices to communicate and the other communication systems 110, 112 would have similar arrangements.

Figure 3:
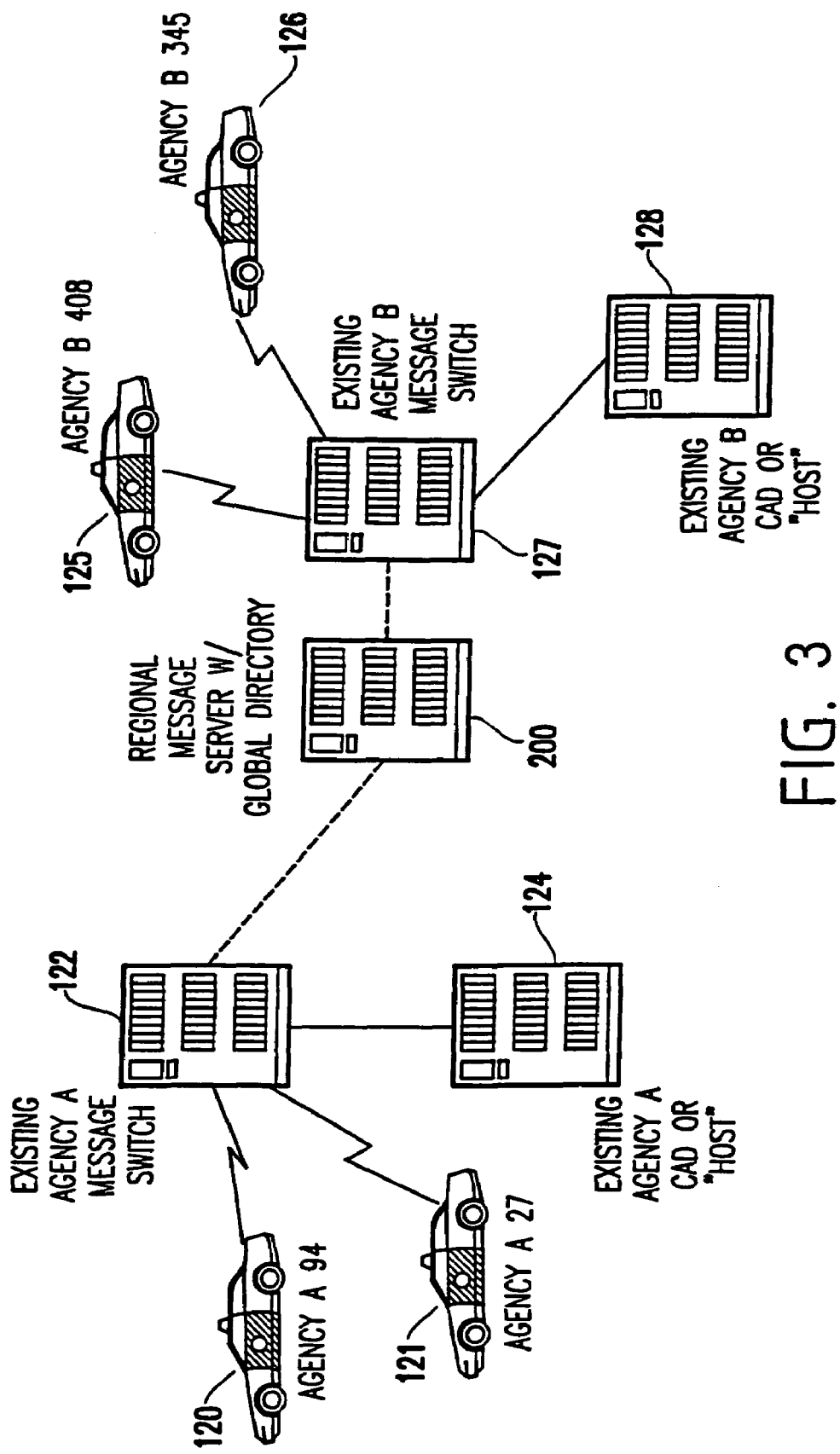
FIG. 3 is a schematic diagram of a system according to the invention.

As shown in FIG. 3, which is shown in U.S. Patent Publication 2003/0125022 A1 (the disclosure of which is hereby incorporated by reference), two communication units 120, 121 within a given agency (e.g., Agency A) presently have an existing mobile data system (message switch 122, CAD host 123) in place. These systems were designed to allow officers within each respective agency to send and receive messages among local agency units 120, 121 and the local host (CAD) 123 systems. Agency B similarly includes mobile units 125, 126, message switch 127, and host 128. A global directory, implemented on a "regional message server" 200, provides a way for existing agencies to continue using their existing addressing schemes for local users, yet participate in the regional message server network. The global directory 200 may also be used by an officer in one agency to address a message to individuals in other agencies in situations requiring cooperation or assistance. The regional message server 200 utilizes an addressing scheme based upon a hierarchical scheme. This permits each individual system's address scheme to remain intact, without modification. When messages are transmitted between different units 120, 121 within a given system, the messages are unaltered and operate according to that system's requirements. However, when messages are transmitted through the regional message server 200 to a unit in a different agency, additional information is added to the original message by the regional message server 200 that identifies the agency to which the message is directed.

If necessary, the invention uses a voice/text converter 109 to convert voice messages into text messages and text messages into voice messages, such that a voice user in a first wireless communication system 110 may transparently communicate with a data text user (user 200 using PDA 207) in a second wireless communication system 111 through the communication server 100. Also, the communication mediator 106 can automatically select whether the communication session will be a one-to-one communication session, a one-to-many communication session, or a many-to-many communication session. One of these options can be set as default, which can be overridden if the user initiating the session specifically chooses any of the other options. Alternatively, the type of the session can be automatically determined by the type of an incident.

As shown in FIG. 2, the users 202, 204, 206 can each maintain multiple communication devices (e.g., cell phone, two-way land mobile radio, text messaging, etc.), and the communication mediator 106 is adapted to automatically attempt to communicate with different communication devices maintained by the participants in a predetermined order. This predetermined order can be different for different participants and is established according to the individual preferences of each of the participants. Thus, each user's available devices and the order in which communication attempts should be made can be set by the users or the communication systems in advance of the occurrence of an actual incident or determined by the communication mediator by other data.

Connection can be made to an intended recipient's computer, landline phone, cell phone, radio, or instant messaging client (after transcribing the voice to text). These alternatives can be listed and tried in the pre-specified order discussed above or, based on one or more conditions (time of day, urgency, or other computable condition) an alternative order can be used. For example, for low-priority communication, a beeper can be used to send a simple message, such as a reminder. However, in a high-priority emergency, a two-way land mobile radio, may be utilized first, or all available communication devices can be contacted simultaneously. Similarly, a broadcast can be associated with a group or incident. Note that this is far more flexible than a frequency based "channel" broadcast using a Land Mobile Radio (LMR) system. For example, in a frequency based "channel" broadcast, participants cannot be chosen to match a specific incident and the skill required to respond to that incident. Anyone tuned into that particular frequency channel becomes a participant by default. Because the communications mediator has data pertaining to the incident it may add particular communication devices to the incident based on incident criteria. Other benefits include, (i) mixed voice and text broadcast and/or conferencing, (ii) conferencing, where the participant list can be a particular portion of the Global Directory or users associated with an incident, and (iii) initiation and execution of system inquiries by voice.

The invention also presents a method of providing communications between different communication systems 110-112, that begins by identifying incident and associating different communication systems 110-112 with the incident. The invention places the communication systems 110-112 in communication with a communication server 100 and manages the difference between the message transport layer of the first communication system and the message transport layer of the second communication system, and vice versa. Again, the invention restricts communications between the first communication system and the second communication system by incident.

Also, the invention allows a user to designate, which participants will participate in a communication session. More specifically, the participants are selected from users within communication systems 110-112 that are already registered with an incident. The participants can maintain multiple communication devices (e.g., cell phone, PDA, two-way land mobile radio, etc.) and the invention automatically attempts to communicate with different communication devices maintained by the participants in a predetermined order using the communication mediator 106.

Figure 4:
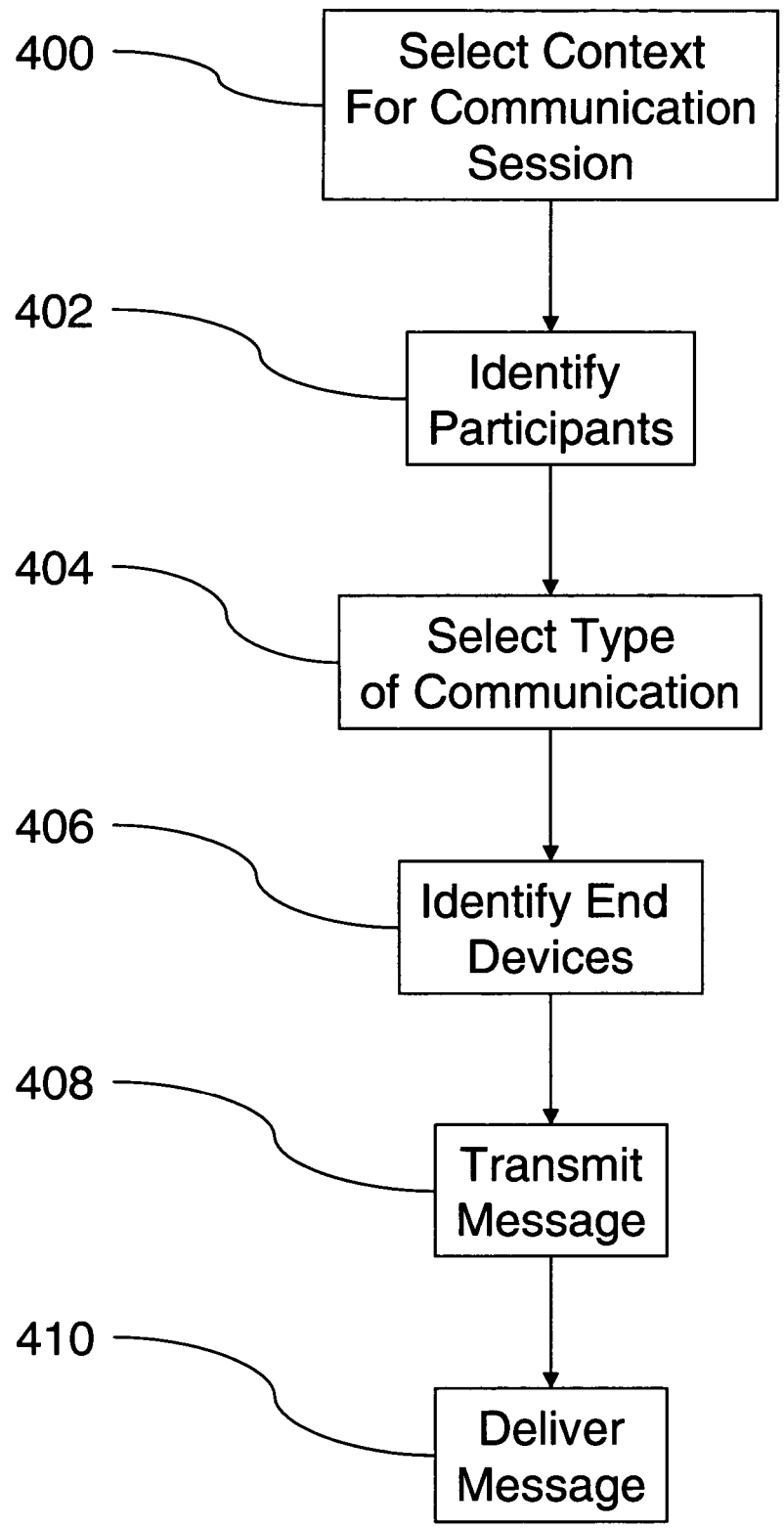
FIG. 4 is a flow diagram illustrating a preferred method of the invention.

As shown in FIG. 4, the process of establishing communications is broken down by the communication server 100 into the following steps. First, in item 400, the context for communication is selected by the user setting up the communication session or selected automatically. The "context" of a communication session is a type of incident (e.g., emergency, fire or accident, non-emergency conference call, emergency or non-emergency investigation, etc.) associated with the communication session. The incident in turn helps to determine the parameters defining the communication session (i.e., who needs to participate, type of session—one to many, one to one, many to many, how the participants can be reached, etc.)

The desired participants are then identified in item 402 by the user setting up the communication session. This step can be completed conveniently using a device that supports text/data. However, for a user with a land mobile radio this can be done through voice activated commands, even though this is somewhat inconvenient compared to a text/data enabled device. An alternative approach for a user with land mobile radio is to set up the communication session using a text/data enabled device and then participate in the communication session using a two-way/land mobile radio. The latter is a preferred situation where the user/first responder may not have his/her "hands free" except at the beginning of an incident (fire fighters typically cannot use their hands/fingers while fighting a fire). The type of communication is then decided upon 404 (one-to-one, one-to-many, many-to-many) by the user setting up the communication session or may be automatically decided by the communication mediator depending on the incident type and/or default settings or other data. The end device(s) are then identified in item 406 that are associated with the intended recipient(s) according to the user preferences (as shown above in FIG. 2). The voice or data message is then transmitted 408 using a network (IP, telephone land lines, radio, etc.). The voice or its representation (which could be automatically transcribed text) is then delivered to the recipient's device 410.

Therefore, the invention provides a new system of third party call control. The mediator 106 comprises a "virtual operator" within the context of an incident. This "virtual operator" is completely automated, always available, always knows where callers are (e.g., for example by accessing an automatic vehicle location system's database), how they prefer to be reached, and can connect them regardless of whether one party has a land based phone and another has a radio, or any other voice or data-enabled device. This "virtual operator" within the context of an incident supports clear and explicit separation of the steps identified above in FIG. 4, allowing precise control of each step.

Thus, the invention coordinates data interoperability of the communication systems 110-112 and voice interoperability of the communication systems 110-112 using the communication mediator 106. The invention automatically selects an appropriate communication mode (e.g., land-line telephone, wireless telephone, cellular telephone, text messaging, two-way radio, broadcast radio, e-mail, and voice over internet protocol (VOIP), etc. ) depending upon the preferred communication modes of the participants designated by the user. The invention also automatically selects whether the communication session will be a one-to-one communication session, a one-to-many communication session, or a many-to-many communication session.

The translating process translates voice messages to text messages and translates text messages to voice messages, such that a voice user in the first communication system may transparently communicate with a data/text user in the same or the second communication system through the communication server 100. The transmitting process transfers the messages so as to provide real-time communication between users of the different communication systems 110-112.

This approach has many advantages in a first responder interoperability environment. For example, the information retrieved by the communication mediator from the Global Directory (part of the data interoperability infrastructure) is dynamic in nature, and the association of users' names with an incident is transient. This is very different from a discovery process based on a directory or "yellow/white pages", which are static in nature. Further, with the invention connection can be made to an intended recipient's computer, land line phone, cell phone, radio, or instant messaging client (after transcribing the voice to text). These alternatives can be listed and tried in a pre-specified order based on some condition (time of day, urgency, or other computable condition). The invention can also perform communications by broadcast, where broadcast can be associated with a group (in the global directory) or an incident in the incident list. Note that this is far more flexible compared to a frequency based "channel" broadcast in the LMR space.

The invention performs mixed voice and text broadcast and conferencing where the participant list can be a particular portion of the global directory or users associated with an incident. Also, the invention can search for a person (global directory search or incident list search) using voice, and the invention allows submission of queries to back-end data systems using voice.

The communication mediator architecture can be utilized to provide interoperability. In particular, the invention is useful for a system for important package delivery, where a communication mediator in conjunction with a directory of delivery participants (distribution warehouse, trucking company, delivery person, mail clerk, etc.) can be used to facilitate interoperability and communication among the persons participating in the delivery of an important package. Also, the invention would benefit a system in the health care environment where an emergency situation involving specialized skills or information can bring together the appropriate skilled individuals to treat a specific condition.

While the invention has been described in terms of preferred embodiments, those skilled in the art will recognize that the invention can be practiced with modification within the spirit and scope of the appended claims.

What is claimed is:

1. A communication server comprising:
   a session gateway adapted to initiate communication sessions between users operating under different communication systems;
   a connection manger connected to said session gateway unit, said connection manager being adapted to translate messages into formats compatible with said communication systems;
   a registration unit adapted to associate said communication systems with an incident, such that communications between said communication systems is restricted by incident and by registration; and
   a communication mediator adapted to conduct said communication sessions through said session gateway,
   wherein said communication sessions are conducted by said communication mediator between participants designated by a user, and
   wherein said participants are selected from users within communication systems that are registered with an incident.

2. The communication server in claim 1, wherein said communication mediator is adapted to coordinate data interoperability of said communication systems and voice interoperability of said communication systems.

3. The communication server in claim 1, wherein said communication mediator is adapted to automatically select an appropriate communication mode depending upon preferred communications modes of said participants designated by said user.

4. The communication server in claim 3, wherein different communication modes include land-line telephone, wireless telephone, cellular telephone, text messaging, two-way radio, broadcast radio, e-mail, and voice over internet protocol (VOIP).

5. The communication server in claim 1, wherein said communication mediator is adapted to automatically select whether said communication session will be:
   a one-to-one communication session;
   a one-to-many communication session; or
   a many-to-many communication session.

6. The communication server in claim 1, further comprising a voice/data/text converter adapted to convert voice messages into data/text messages and data/text messages into voice messages, such that a voice user in a first communication system may transparently communicate with a data/text user in a second communication system through said communication server.

7. The communication server in claim 1, wherein said session gateway unit is adapted to initiate said communication sessions so as to provide real-time communication between users of said different wireless communication systems.

8. A communication server comprising:
   a session gateway unit adapted to initiate communication sessions between users operating under different communication systems;
   a connection manger connected to said session gateway unit, said wireless connection manager being adapted to translate messages into formats compatible with said communication systems;
   a registration unit adapted to associate said communication systems with an incident, such that communications between said communication systems is restricted by incident and by registration; and
   a communication mediator adapted to conduct said communication sessions through said session gateway, wherein said communication sessions are conducted by said communication mediator between participants designated by a user, and wherein said participants are selected from users within communication systems that are registered with an incident, wherein said participants maintain multiple communication devices, and said communication mediator is adapted to automatically attempt to communicate with different communication devices maintained by said participants in a predetermined order.

9. The communication server in claim 8, wherein said predetermined order is different for different participants.

10. The communication server in claim 8, wherein said predetermined order is established according to the individual preferences of each of said participants.

11. The communication server in claim 8, wherein said communication mediator is adapted to automatically select an appropriate communication mode depending upon pre-set rules of preferred communications modes of said participants.

12. The communication server in claim 8, wherein said communication mediator is adapted to automatically select whether said communication session will be:
   a one-to-one communication session;
   a one-to-many communication session; or
   a many-to-many communication session.

13. The communication server in claim 8, further comprising a voice/data/text converter adapted to convert voice messages into data/text messages and data/text messages into voice messages, such that a voice user in a first communication system may transparently communicate with a data/text user in a second communication system through said communication server.

14. The communication server in claim 1, wherein said session gatewayunit is adapted to set up communication sessions so as to provide real-time communication between users of said different wireless communication systems.

15. A method of providing communications between different communication systems, said method comprising:
   identifying an incident;
   associating at least one first communication system with said incident;
   associating at least one second communication system with said incident;
   placing said first communication system and said second communication system in communication with a communication server,
   translating messages sent from said first communication system into a format compatible with said second communication system and translating messages sent from said second communication system into a format compatible with said first communication system, using said communication server;
   restricting communications between said first communication system and said second communication system by incident; and
   designating participants to a communication session, wherein said participants are selected from users within communication systems that are registered with an incident.

16. The method in claim 15, further comprising coordinating data interoperability of said communication systems and voice interoperability of said communication systems.

17. The method in claim 15, further comprising automatically selecting an appropriate communication mode depending upon preferred communication modes of said participants designated by said user.

18. The method in claim 17, wherein preferred communication modes include land-line telephone, wireless telephone, cellular telephone, text messaging, two-way land mobile radio, broadcast radio, e-mail, and voice over internet protocol (VOIP).

19. The method in claim 15, further comprising automatically selecting whether said communication session will be:
   a one-to-one communication session;
   a one-to-many communication session; or
   a many-to-many communication session.

20. The method in claim 15, wherein said translating further comprises translating voice messages to data/text messages and translating data/text messages to voice messages, such that a voice user in said first communication system may transparently communicate with a data/text user in the same or said second communication system through said communication server.

21. The method in claim 15, further comprising transmitting said messages so as to provide real-time communication between users of said different communication systems.

22. A method of providing communications between different communication systems, said method comprising:
   identifying an incident;
   associating at least one first communication system with said incident;
   associating at least one second communication system with said incident;
   placing said first communication system and said second communication system in communication with a communication server,
   translating messages sent from said first communication system into a format compatible with said second communication system and translating messages sent from said second communication system into a format compatible with said first communication system, using said communication server;
   restricting communications between said first communication system and said second communication system by incident;
   designating participants to a communication session, wherein said participants are selected from users within communication systems that are registered with an incident and wherein said participants maintain multiple communication devices; and
   automatically attempting to communicate with different communication devices maintained by said participants in a predetermined order.

23. The method in claim 22, further comprising coordinating data interoperability of said communication systems and voice interoperability of said communication systems.

24. The method in claim 22, further comprising automatically selecting an appropriate communication mode depending upon preferred communication modes of said participants designated by said user.

25. The method in claim 24, wherein preferred communication modes include land-line telephone, wireless telephone, cellular telephone, text messaging, two-way land mobile radio, broadcast radio, e-mail, and voice over internet protocol (VOIP).

26. The method in claim 22, further comprising automatically selecting whether said communication session will be:
- a one-to-one communication session;
- a one-to-many communication session; or
- a many-to-many communication session.

27. The method in claim 22, wherein said translating further comprises translating voice messages to data/text messages and translating data/text messages to voice messages, such that a voice user in said first communication system may transparently communicate with a data/text user in the same or said second communication system through said communication server.

28. The method in claim 22, further comprising transmitting said messages so as to provide real-time communication between users of said different communication systems.

* * * * *